US009329057B2

(12) United States Patent  
Foletto et al.

(10) Patent No.: US 9,329,057 B2  
(45) Date of Patent: May 3, 2016

(54) GEAR TOOTH SENSOR WITH PEAK AND THRESHOLD DETECTORS

(75) Inventors: Andrea Foletto, Annecy (FR); Michael Morris, Deerfield, NH (US); Mathew Drouin, Hooksett, NH (US); Devon Fernandez, Londonderry, NH (US); Andreas P. Friedrich, Metz-Tessy (FR); P. Karl Scheller, Bow, NH (US)

(73) Assignee: Allegro Microsystems, LLC, Worcester, MA (US)

( * ) Notice: Subject to any disclaimer, the term of this patent is extended or adjusted under 35 U.S.C. 154(b) by 957 days.

(21) Appl. No.: 13/484,501

(22) Filed: May 31, 2012

(65) Prior Publication Data

US 2013/0320970 A1 Dec. 5, 2013

(51) Int. Cl.
*G01R 33/06* (2006.01)
*G01D 5/244* (2006.01)
*G01R 33/02* (2006.01)
*G01D 5/14* (2006.01)

(52) U.S. Cl.
CPC .............. *G01D 5/2448* (2013.01); *G01D 5/145* (2013.01)

(58) Field of Classification Search
CPC .......................................... G01D 5/12–5/2525
USPC .................................................. 324/200–263
See application file for complete search history.

(56) References Cited

U.S. PATENT DOCUMENTS 3,304,434 A 2/1967 Koster
4,185,265 A 1/1980 Griffin et al.
4,225,939 A 9/1980 Yashiro
4,283,679 A 8/1981 Ito et al.
4,293,814 A 10/1981 Boyer
4,367,721 A 1/1983 Boyer
4,374,333 A 2/1983 Avery (Continued)

FOREIGN PATENT DOCUMENTS

DE 38 15 530 A1 11/1989
DE 196 50 935 A1 6/1998

(Continued)

OTHER PUBLICATIONS

Allegro Microsystems, Inc.; ATS651LSH Datasheet; "Two-Wire Self-Calibrating Differential Speed and Direction Sensor IC with Vibration Immunity"; 2005-2009; pp. 1-12.

(Continued)

*Primary Examiner* — Tung X Nguyen
*Assistant Examiner* — David Frederiksen
(74) *Attorney, Agent, or Firm* — Daly, Crowley, Mofford & Durkee, LLP

(57) ABSTRACT

Presented herein is a magnetic field sensor architecture that uses outputs of a peak detector and threshold detector operating in parallel to detect magnetic anomalies that may be associated with the target being sensed, e.g., a rotational ferromagnetic object such as a toothed gear, and use such detection to prevent sensor malfunction. The sensor includes an edge detection circuit and an error detection circuit. In one embodiment, the edge detection circuit includes circuits to detect edges (or transitions) of the threshold and peak detector output signals and the error detection circuit includes circuits, responsive to the edge detection circuit, to indicate an error when a "missed transition" occurs or a peak-to-peak value of an input signal as detected by the peak detector for a current cycle differs from an expected peak-to-peak value by a predetermined amount.

35 Claims, 7 Drawing Sheets

(56) References Cited

U.S. PATENT DOCUMENTS

| | | | |
|---|---|---|---|
| 4,443,716 A | 4/1984 | Avery | |
| 4,476,901 A | 10/1984 | Sainen | |
| 4,513,403 A | 4/1985 | Troy | |
| 4,642,555 A | 2/1987 | Swartz et al. | |
| 4,649,796 A | 3/1987 | Schmidt | |
| 4,705,964 A | 11/1987 | Higgs | |
| 4,893,027 A | 1/1990 | Kammerer et al. | |
| 4,906,928 A | 3/1990 | Gard | |
| 4,992,731 A | 2/1991 | Lorenzen | |
| 5,099,197 A | 3/1992 | Hauck et al. | |
| 5,291,133 A | 3/1994 | Gokhale et al. | |
| 5,317,258 A | 5/1994 | Setzer et al. | |
| 5,332,956 A | 7/1994 | Oh | |
| 5,442,283 A | 8/1995 | Vig et al. | |
| 5,451,946 A | 9/1995 | Smith et al. | |
| 5,459,398 A | 10/1995 | Hansen et al. | |
| 5,477,142 A | 12/1995 | Good et al. | |
| 5,486,759 A | 1/1996 | Seiler et al. | |
| 5,493,219 A | 2/1996 | Makino et al. | |
| 5,497,084 A | 3/1996 | Bicking | |
| 5,510,706 A | 4/1996 | Good et al. | |
| 5,650,719 A | 7/1997 | Moody et al. | |
| 5,694,038 A | 12/1997 | Moody et al. | |
| 5,696,790 A | 12/1997 | Graham et al. | |
| 5,729,130 A | 3/1998 | Moody et al. | |
| 5,781,005 A | 7/1998 | Vig et al. | |
| 5,801,655 A | 9/1998 | Imamura | |
| 5,917,320 A | 6/1999 | Scheller et al. | |
| 6,091,239 A | 7/2000 | Vig et al. | |
| 6,100,680 A | 8/2000 | Vig et al. | |
| 6,232,768 B1 | 5/2001 | Moody et al. | |
| 6,242,904 B1 | 6/2001 | Shirai et al. | |
| 6,242,905 B1 | 6/2001 | Draxelmayr | |
| 6,279,248 B1 | 8/2001 | Walters | |
| 6,297,627 B1 | 10/2001 | Towne et al. | |
| 6,297,681 B1 | 10/2001 | Wang | |
| 6,317,067 B1 | 11/2001 | Mohindra | |
| 6,492,804 B2 | 12/2002 | Tsuge et al. | |
| 6,556,153 B1* | 4/2003 | Cardamone | G01D 5/24404 341/111 |
| 6,647,757 B1 | 11/2003 | Schneider | |
| 6,653,968 B1 | 11/2003 | Schneider | |
| 6,687,644 B1 | 2/2004 | Zinke et al. | |
| 6,693,419 B2 | 2/2004 | Stauth et al. | |
| 6,795,007 B2 | 9/2004 | Mayes | |
| 6,815,944 B2 | 11/2004 | Vig et al. | |
| 6,967,476 B2 | 11/2005 | Block et al. | |
| 7,013,233 B2 | 3/2006 | Block et al. | |
| 7,026,808 B2 | 4/2006 | Vig et al. | |
| 7,095,225 B2 | 8/2006 | Walter et al. | |
| 7,141,964 B2 | 11/2006 | Hoffman et al. | |
| 7,184,876 B2 | 2/2007 | Teulings et al. | |
| 7,199,579 B2 | 4/2007 | Scheller et al. | |
| 7,253,614 B2 | 8/2007 | Forrest et al. | |
| 7,295,000 B2 | 11/2007 | Werth | |
| 7,362,094 B2 | 4/2008 | Voisine et al. | |
| 7,365,530 B2 | 4/2008 | Bailey et al. | |
| 7,368,904 B2 | 5/2008 | Scheller et al. | |
| 7,463,127 B2* | 12/2008 | Wan | G01D 5/14 335/207 |
| 7,548,056 B2 | 6/2009 | Voisine et al. | |
| 7,592,801 B2 | 9/2009 | Bailey et al. | |
| 7,619,406 B2 | 11/2009 | Voisine et al. | |
| 7,622,914 B2* | 11/2009 | Bailey | G01H 1/003 324/207.25 |
| 7,694,200 B2 | 4/2010 | Forrest et al. | |
| 7,772,838 B2 | 8/2010 | Bailey et al. | |
| 7,982,454 B2 | 7/2011 | Fernandez et al. | |
| 2001/0002791 A1 | 6/2001 | Tsuge et al. | |
| 2004/0062362 A1 | 4/2004 | Matsuya | |
| 2005/0225318 A1 | 10/2005 | Bailey et al. | |
| 2005/0225319 A1 | 10/2005 | Bailey et al. | |
| 2006/0009941 A1* | 1/2006 | Motz | G01D 5/2448 702/116 |
| 2006/0208729 A1 | 9/2006 | Forrest et al. | |
| 2007/0132450 A1 | 6/2007 | Scheller et al. | |
| 2008/0164871 A1 | 7/2008 | Bailey et al. | |
| 2009/0204361 A1* | 8/2009 | Watasue | B60C 23/0408 702/141 |
| 2010/0201396 A1* | 8/2010 | Cop | G01R 31/34 324/765.01 |
| 2010/0298450 A1 | 11/2010 | Datta et al. | |
| 2011/0291743 A1* | 12/2011 | Taylor | A61B 5/0068 327/517 |
| 2011/0298447 A1 | 12/2011 | Foletto et al. | |
| 2011/0298448 A1 | 12/2011 | Foletto et al. | |
| 2011/0298449 A1 | 12/2011 | Foletto et al. | |
| 2012/0249126 A1 | 10/2012 | Friedrich et al. | |

FOREIGN PATENT DOCUMENTS

| | | |
|---|---|---|
| DE | 197 17 364 C1 | 8/1998 |
| DE | 199 61 504 A1 | 6/2001 |
| WO | WO 96/23198 | 8/1996 |
| WO | WO 03/069358 A2 | 8/2003 |
| WO | WO 03/098229 A1 | 11/2003 |
| WO | WO 03/098230 A1 | 11/2003 |
| WO | WO 03/100352 A1 | 12/2003 |
| WO | WO 2013/017211 A1 | 2/2013 |

OTHER PUBLICATIONS

Allegro Microsystems, Inc.; ATS657 Datasheet; "Dynamic, Self-Calibrating, Threshold-Detecting, Differential Speed and Direction Hall-Effect Gear Tooth Sensor IC"; 2009; pp. 1-15.

Allegro Microsystems, Inc.; ATS692LSH(RSNBL) Datasheet; Two-Wire, Differential, Vibration Resistant Sensor IC with Speed and Direction Output; 2010; pp. 1-12.

Amendment filed Apr. 27, 2009 in U.S. Appl. No. 12/053,004, 12 pages.

Amendment filed Dec. 18, 2008 in U.S. Appl. No. 12/053,004, 10 pages.

Infineon Technologies; "Differential Two-Wire Hall Effect Sensor I C;" TLE4942 Preliminary Data Sheet; Jun. 2000; pp. 1-13.

Infineon Technologies; "Differential Two-Wire Hall Effect Sensor I C;" TLE4953C Preliminary Data Sheet; Jun. 2000; pp. 1-15.

Partial International Search Report for PCT/US2003/002489 issued for the PCT application; form PCT/ISA206; Oct. 2, 2003; 2 pages.

PCT Search Report and Written Opinion of the ISA for PCT/US2003/002489 dated Nov. 19, 2003.

PCT Search Report and Written Opinion of the ISA for PCT/US2006/007824 dated Jul. 7, 2006.

Preliminary Amendment filed on Mar. 21, 2008 in U.S. Appl. No. 12/053,004, 9 pages.

PTO Notice of Allowance, U.S. Appl. No. 12/053,004 dated May 22, 2009, 7 pages.

PTO Office Action dated Mar. 24, 2009 in U.S. Appl. No. 12/053,004, 6 pages.

PTO Office Action dated Oct. 30, 2008 in U.S. Appl. No. 12/053,004, 5 pages.

Robert Bosch GMBH Stuttgart; "Active Sensor for ABS/ASR/VED-Systems with 2-Wire Current Interface;" Specification TLE4941/TLE4942; Version 5, Jul. 25, 2000; 44 pages.

U.S. Appl. No. 10/820,957, filed Apr. 8, 2004.

Response to International Preliminary Report on Patentability flied May 29, 2015 for European Application No. 137206959; 19 pages.

Notification Concerning Transmittal of International Preliminary Report on Patentability (Chapter 1 of the Patent Cooperation Treaty) dated Jul. 12, 2013, PCT/US2013/037887, 1 page.

International Search Report dated Jul. 12, 2013, PCT/US2013/037887, 4 pages.

Written Opinion of the International Searching Authority, PCT/US2013/037887 Jul. 12, 2013, 6 pages.

International Preliminary Report dated Dec. 11, 2014 for PCT Application No. PCT/US2013/037887; 8 pages.

* cited by examiner

GEAR TOOTH SENSOR WITH PEAK AND THRESHOLD DETECTORS

CROSS-REFERENCE TO RELATED APPLICATIONS

Not applicable.

STATEMENT REGARDING FEDERALLY SPONSORED RESEARCH

Not applicable.

FIELD OF THE INVENTION

This invention relates generally to rotational motion sensors and more particularly, to gear tooth sensors that utilize magnetic field sensing elements for rotational motion detection.

BACKGROUND OF THE INVENTION

Magnetic field sensors that sense the rotational motion of a target are known. The target can be a hard ferromagnetic (permanent magnet) or a soft ferromagnetic target. Magnetic field sensors that detect the features of a ferromagnetic gear target belong to a class of sensors known as "gear tooth sensors." Gear tooth sensors are key elements in engine management applications, anti-lock braking systems, transmission systems, and other industrial or automotive systems.

In this type of magnetic field sensor, the magnetic field associated with the target's mechanical profile is sensed by a magnetic field sensing element, such as Hall element or magnetoresistive (MR) element. In the case where the target is a soft ferromagnetic material a permanent magnet may be positioned near the sensor to provide a magnetic field to the sensing element. As the target's features pass the sensing element, the magnetic field experienced by the sensing element varies in relation to the target profile. The sensing element provides a signal proportional to the sensed magnetic field. The sensor processes the magnetic field signal to generate an output signal that changes state each time the magnetic field signal crosses a threshold. Such an output can be used to provide rotational speed information.

Some sensors, referred to as differential sensors, contain at least one pair of sensing elements configured in a differential arrangement. In differential magnetic field sensors, the difference between the signals provided by the two sensing elements is used to generate a differential magnetic field signal indicative of transitions in the target's features. The differential sensor processes the differential magnetic field signal to generate an output signal that switches states each time the differential magnetic field signal crosses a threshold. Thus, detection of the approach and retreat of each feature of a rotating ferromagnetic gear results in an output signal that is typically a square wave representation of rotation of the ferromagnetic gear.

Various types of threshold-based mechanisms can be used to generate the output signal. One such mechanism is referred to as a threshold detector or peak-to-peak percentage detector (and referred to herein as a threshold detector). It uses thresholds defined as a percentage of the peak-to-peak magnetic field signal (e.g., 40% and 60%). One type of threshold detector is described in U.S. Pat. No. 5,917,320 entitled DETECTION OF PASSING MAGNETIC ARTICLES WHILE PERIODICALLY ADAPTING DETECTION THRESHOLD, which is assigned to the assignee of the subject application. Each threshold is determined based on a previous negative and positive peak. If the magnetic field signal doesn't cross one of these thresholds (e.g., because of a sudden large signal shift), the thresholds cannot be updated. If the thresholds are not updated, the output signal will stop switching.

Another mechanism, referred to as a slope-activated, peak-referenced or peak detector (and referred to herein as a peak detector), uses a fixed or variable threshold referenced to the last positive or negative peak (i.e., the last peak or valley) of the magnetic field signal. In the peak detector, the threshold differs from the positive and negative peaks of the magnetic field signal by a predetermined amount. In this type of detector, the output signal changes state when the magnetic field signal comes away from a peak or valley by the predetermined amount. One type of peak detector is described in U.S. Pat. No. 6,091,239 entitled DETECTION OF PASSING MAGNETIC ARTICLES WITH A PEAK-REFERENCED THRESHOLD DETECTOR, which is assigned to the assignee of the subject application. Another example of a peak detector can be found in U.S. Pat. No. 6,693,419 entitled PROXIMITY DETECTOR, also assigned to the assignee of the subject application.

In order to accurately detect the passing features of the rotating ferromagnetic object, these circuits must be capable of closely tracking the magnetic field signal. Typically, one or more digital-to-analog converters (DACs) are used to generate a DAC signal, which tracks the magnetic field signal. In some architectures, one DAC is used to track the positive peaks of the magnetic field signal (PDAC) and another DAC is used to track the negative peaks of the magnetic field signal (NDAC). In other architectures, a single DAC tracks both the positive and negative peaks of the magnetic field signal.

Both detection schemes have their advantages and disadvantages. The peak detector tends to offer a more robust approach to switching, with guaranteed switching even in the presence of large signal variation. The peak detector is commonly used for sensors in automotive anti-lock braking systems (ABS) and transmission applications where magnetic anomalies may compromise the functionality of the sensor. The threshold detector, on the other hand, tends to provide greater switching accuracy.

Some gear tooth sensor architectures incorporate both threshold and peak detection in order to differentiate vibration from true rotation. Examples include the ATS651LSH, ATS655/7LSH and ATS692/3LSH family of differential Hall-effect gear tooth sensors available from Allegro Microsystems, Inc.

SUMMARY OF THE INVENTION

In general, in one aspect, the invention is directed to a sensor that includes: a magnetic field signal generating circuit including at least one sensing element to generate a magnetic field signal indicative of features of a rotational ferromagnetic object as the features pass in front of the at least one sensing element, a threshold detector, responsive to the magnetic field signal, to generate a threshold detector output signal, and a peak detector, responsive to the magnetic field signal, to generate a peak detector output signal. The threshold and peak detector output signals each have transitions associated with cycles of the magnetic field signal. Also included in the sensor is a circuit, coupled to the threshold detector and peak detector, to detect transitions of the threshold detector output signal and peak detector output signal, and to use the detected transitions to detect an error if a sequence in which the transitions occur deviates from an expected sequence.

Embodiments of the invention may include one or more of the following features.

The circuit can operate to generate an error signal having a level indicative of the error when such error is detected. The circuit can include an edge detection circuit to detect the transitions of the peak and threshold output signals and an error detection circuit coupled to the edge detection circuit and responsive to the transitions detection to generate the error signal. The edge detection circuit can include a first edge detector to detect each transition of the peak detector output signal and a second edge detector to detect each transition of the threshold detector output signal.

The error detection circuit can include a first circuit, responsive to the edge detection circuit, to monitor the sequence of the transitions of the peak detector output signal and the threshold detector output signal and to generate a first circuit output signal having a level indicative of a first error when the monitoring detects that the sequence has deviated from the expected sequence. The first circuit can include a counter configured to increment a count value in response to each detected peak detector output signal transition and reset the count value in response to each detected threshold detector output signal transition. The first circuit can further include a comparator to compare the count value to a count limit and set the first circuit output signal level to the level indicative of the first error when the count value reaches the count limit.

The error detection circuit can further include a second circuit, responsive to the detected peak detector output signal transitions, to compare a peak-to-peak value of the magnetic field signal associated with the detected peak detector output signal transitions for a current cycle to an expected peak-to-peak value and to provide a second circuit output signal based on the comparison. The expected peak-to-peak value can be a peak-to-peak value of the magnetic field signal for a corresponding cycle of a prior rotation of the target. The second circuit can include a comparator to compare the peak-to-peak value to a predetermined percentage of the expected peak-to-peak value. The error detection circuit can further include a logic circuit to generate the error signal based on the first circuit output signal and the second circuit output signal.

The sensor can further include an output signal selector having a first input responsive to the threshold detector output signal, a second input responsive to the peak detector output signal, and a control signal to select one of the threshold and peak detector output signals as an output signal based on the error signal generated by the circuit. The threshold detector, when configured to operate in a first mode followed by a second mode, can be caused to return to operating in the first mode when the level of the error signal indicates an error. The threshold detector can operate in the first mode for a recalibration time period. When the recalibration time period is complete, the threshold detector can resume operating in the second mode and generate a signal to reset the state of the control signal.

In another aspect, the invention is directed to a sensor that includes: a magnetic field signal generating circuit including at least one sensing element to generate a magnetic field signal indicative of features of a rotational ferromagnetic object as the features pass in front of the at least one sensing element, a threshold detector, responsive to the magnetic field signal, to generate a threshold detector output signal, and a peak detector, responsive to the magnetic field signal, to generate a peak detector output signal. The threshold and peak detector output signals each have transitions associated with cycles of the magnetic field signal. Also included in the sensor is a circuit, coupled to the threshold detector and peak detector, to detect the transitions of the peak detector output signal and use the detected transitions to detect an error when a peak-to-peak value of the magnetic field signal associated with the detected transitions for a current cycle differs from an expected peak-to-peak value by a predetermined amount.

The sensor architecture presented herein uses the information of a threshold detector and peak detector operating in parallel to detect anomalies of the magnetic field signal that may lead to a malfunction of the sensor or a reduction in switching accuracy. One feature monitors the output of both detectors to determine if the information is not congruent, for example, one detector switches twice while the other doesn't switch. If that is the case, an anomaly is detected and the information can be used to take some corrective action, for example, re-starting the sensor, sending a diagnostic message to the user/application or adjusting the switching strategy. Additionally, the presence of the peak detector in the architecture allows detection of every peak. Consequently, peak-to-peak information can be used to monitor the behavior of target features over multiple rotations. Information of run-out, tooth-to-tooth variation and other mechanical irregularities can easily be extracted from the operations of the sensor. The sensor can therefore be used to optimize switching accuracy, even with degraded magnetic field signals.

BRIEF DESCRIPTION OF THE DRAWINGS

The foregoing features of the invention, as well as the invention itself, may be more fully understood from the following detailed description of the drawings, in which.

DETAILED DESCRIPTION

Figure 1:
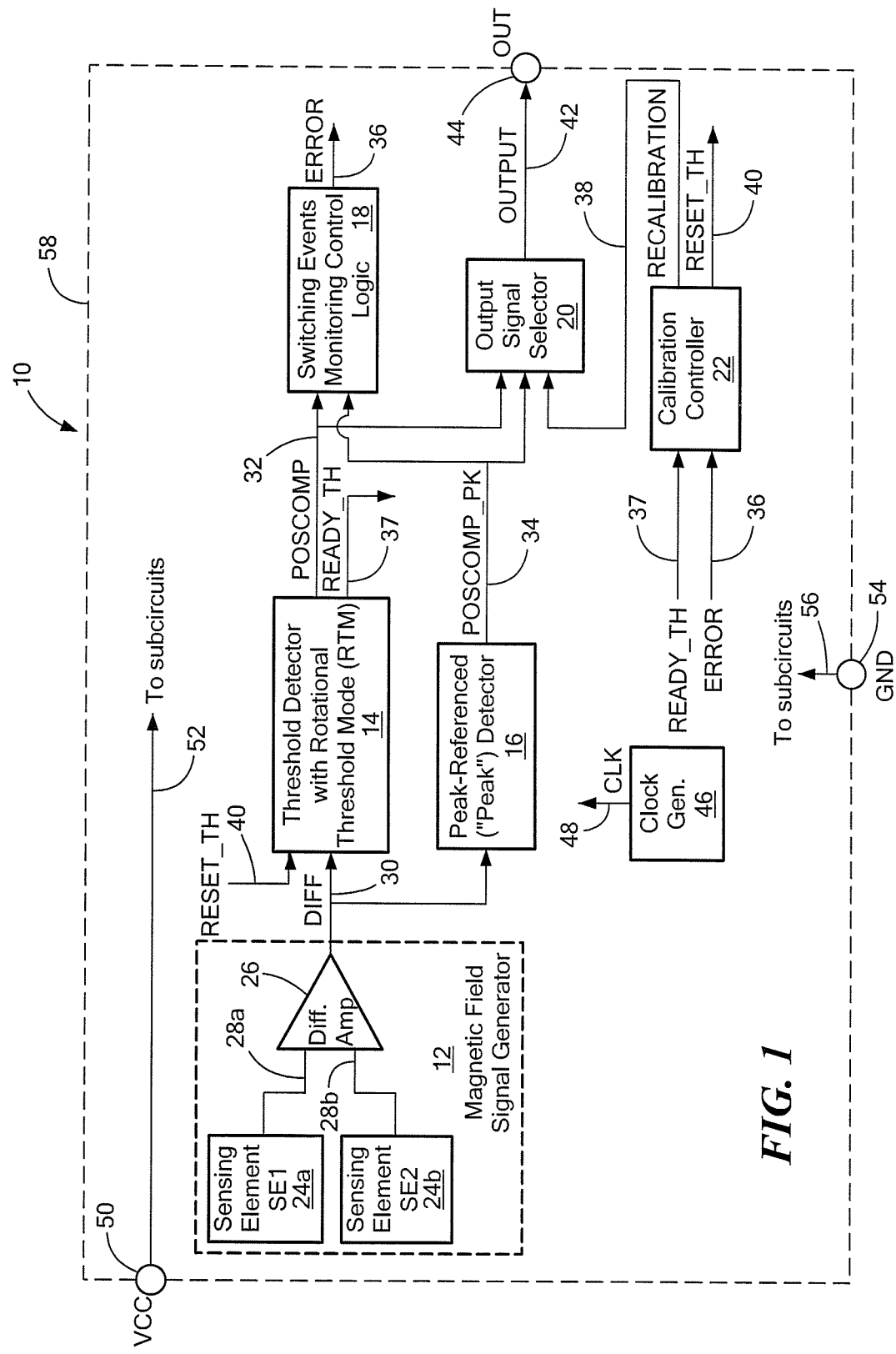
FIG. 1 shows a block diagram of an exemplary differential magnetic field sensor (for ferromagnetic gear tooth motion detection) that includes threshold and peak detectors, a switching events monitoring control logic block to monitor the outputs of the threshold and peak detectors, an output signal selector and a calibration controller.

Referring to FIG. 1, a magnetic field sensor ("sensor") 10 for ferromagnetic gear rotational motion detection is shown. The sensor 10 includes a magnetic field signal generator 12, a threshold detector 14, a peak-referenced (or peak) detector 16, a switching events monitoring control logic block (or, simply, control logic) 18, an output signal selector 20 and a calibration controller 22. The magnetic field signal generator 12 includes at least one differential sensing arrangement of sensing elements shown as a first sensing element ("SE1") 24a and a second sensing element ("SE2") 24b coupled to a differential amplifier 26 by a first sensing element output 28a and second sensing element output 28b, respectively. The differential amplifier 26 generates at its output a magnetic field signal shown as a differential magnetic field ("DIFF") signal 30. The DIFF signal 30 represents the difference in magnetic flux density between the two sensing elements.

The DIFF signal 30 is provided as an input to both the threshold detector 14 and the peak detector 16. The threshold detector 14 generates a threshold detector output signal shown as a "POSCOMP" signal 32. The peak detector 16 generates a peak detector output signal shown as a "POSCOMP_PK" signal 34. Each of these detector output signals is provided as an input to the control logic 18 and the output signal selector 20. Based on these inputs, the control logic 18 operates to generate an output signal ("ERROR" signal) 36 that indicates whether or not an error has occurred.

By "error" it is meant that at least one of the detectors 14, 16 has provided a result that deviates from an expected result, for example, one detector's output signal fails to transition when such transition is expected or a peak as detected by a detector in a current cycle deviates in time from an expected peak, e.g., by a predetermined amount. Such deviations may occur as a result of some anomaly associated with the target, e.g., a change in the direction of the target's rotation or a mechanical irregularity, such as tooth-to-tooth variation, wobble, run-out and the like. The control logic 18 is designed to detect such deviations and flag them as errors. Its output signal, ERROR signal 36, has a first logic level (e.g., an active high) to indicate that an error was detected and a second logic level to indicate that no error was detected. The operation of the control logic 18 and its error detection capability will be described in greater detail below, in particular, with reference to FIGS. 4-7.

The ERROR signal 36 and a signal shown as a READY_TH signal 37, which is generated by the threshold detector 14 in the illustrated embodiment, are provided as inputs to the calibration controller 22, which generates as outputs two control signals. The two output control signals include a first control signal shown as a "RECALIBRATION" signal 38 and a second control signal shown as a reset threshold ("RESET_TH") signal 40. The RESET_TH signal 40 is provided as an input to the threshold detector 14. The RECALIBRATION signal 38 is provided to the output signal selector 20. In response to the signals 32, 34 and 38, the output signal selector 20 provides a selected one of detector output signals 32 and 34 as an output signal (OUTPUT) 42 at a sensor output (OUT) 44. Also shown in the figure is a clock generator 46 that generates clock signals (collectively, indicated as CLK 48) for use by various clocked subcircuits of sensor 10.

In an application, when the sensor 10 is positioned in proximity to a target, more particularly, a rotating ferromagnetic article such as a toothed gear, the sensor output signal 42 is indicative of the speed of rotation. This output signal is made available to a user or application. It will be appreciated that the ferromagnetic article or object may be a hard ferromagnetic material or a soft ferromagnetic material.

Although the magnetic field signal generator 12 is illustrated as a single differential channel implementation, more than one differential channel could be used. Multiple pairs of sensing elements and differential amplifiers would be required to realize multiple differential channels. Alternatively, the magnetic field signal generator 12 may be provided as a single-point implementation, which would require only a single sensing element, e.g., SE1. There would be no need for a differential function (performed by the differential amplifier 26 in FIG. 1), in the single-point implementation. Some magnetic field signal amplification would most likely still be required.

An external power supply voltage can be provided to the sensor 10 at a VCC terminal or input 50. The sensor's sub-circuits are coupled to the VCC input 50 via a VCC bus 52 and are connected to a ground (GND) terminal 54 through an internal GND connection 56.

The sensor 10 may be provided in the form of an integrated circuit (IC) containing a semiconductor substrate on which the various circuit elements are formed. The I/O interface of such an IC is indicated in the figure by dashed lines 58. The packaged IC would have at least one pin to correspond to each of: the VCC input or terminal 50, GND terminal 54 and the output (OUT) 44. The sensor or sensor IC 10 can be provided with other features and signals not shown. It will be appreciated that the functionality of the IC, that is, the circuit elements contained within it, can be varied to suit a particular application.

Figure 2:
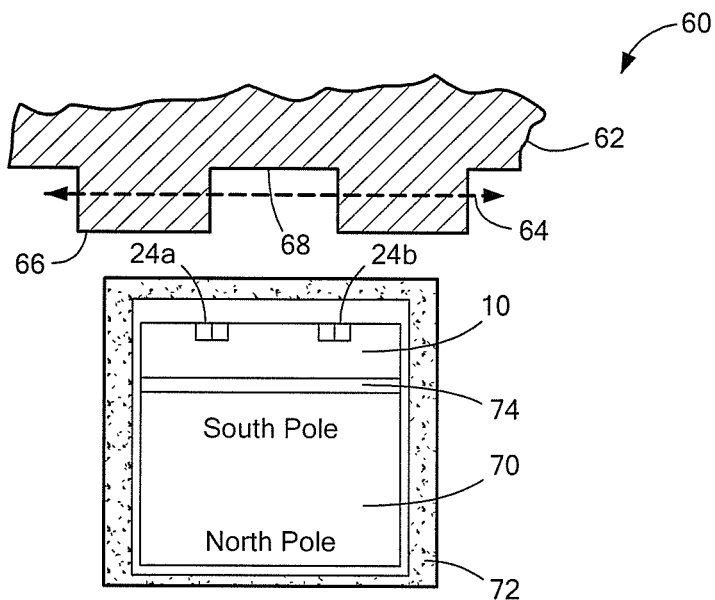
FIG. 2 shows a side view of an exemplary sensing arrangement including a sensor (as shown in FIG. 1) with a biasing magnet and positioned in proximity to a ferromagnetic toothed gear target profile.

FIG. 2 shows an exemplary sensing arrangement 60 in which the magnetic field sensor 10 is arranged in a radial sensing position relative to a rotating target profile 62. A direction of motion of the rotating target profile 62 is indicated by arrow 64. The target profile 62 faces the "front" of the magnetic field sensor 10. In the depicted arrangement, the magnetic field sensor 10 is a differential sensing device and, as such, includes the two sensing elements 24a and 24b for generating a differential signal responsive to change in magnetic field strength at a location relative to the target profile 62.

In FIG. 2, the target profile 62 is defined by an alternating pattern of a raised feature (e.g., a tooth) 66 followed by a gap 68, typically referred to as a valley or recess (or notch). The teeth or other type of raised features can have various shapes based on design requirements. They need not be square-shaped as shown. A target profile pattern such as the one shown in FIG. 2 may be provided along the circumference of the rotating target, e.g., a ferromagnetic object such as a toothed gear wheel, either radially (i.e., along the outer rim or edge of the gear) as shown in FIG. 2, or axially (not shown).

In some sensing arrangements, for example, a sensing arrangement in which features of an object made of a soft ferromagnetic material are to be detected, magnetic biasing may be used. Such an arrangement is shown in FIG. 2. In the illustrated arrangement 60 of FIG. 2, the magnetic field is provided by a biasing permanent magnet 70. The south or north pole of the magnet 70 may be attached to (or positioned near) the sensor 10, for example, to the back of the sensor, as shown. The magnet and sensor may be enclosed together as a subassembly in a case 72. That subassembly can further include a magnetic flux concentrator, for example, a magnetic flux concentrator 74 disposed between the magnet 70 and sensor 10, as shown.

Although not shown in FIG. 1, an output stage provides to sensor output (OUT) a sensor output signal 42 indicative of detected target profile transitions (such as leading and/or trailing tooth edges). The output stage may be implemented as a totem-pole push-pull or open drain, open collector output configuration. This type of configuration is a typical configuration. Devices with such an output are sometimes referred to as "three-wire" devices. A three-wire device is shown in FIG. 1. Alternatively, the output stage could be implemented as a current source output structure that provides two levels of current representing two digital output states of the sensor. In one embodiment, the output current would be provided on the supply/ground lines and the use of a current source output structure would eliminate the need for the output 44. Devices of this type with the current output structure are sometimes referred to as "two-wire" devices. Alternatively, the output can be coded in a protocol like Inter-Integrated Circuit (I²C), Serial Peripheral Interface (SPI), Single Edge Nibble Transmission (SENT) or other protocols used in automotive, industrial or consumer applications.

Other aspects of the magnetic field sensor 10, not shown, may be implemented according to known techniques and designs. It will be understood that the device may contain various other circuits that operate collectively to generate the sensor output from the magnetic field signals of the sensing elements. For example, an amplifier and other circuitry may be coupled between each sensing element and the differential amplifier to amplify the magnetic field and, optionally, to implement other features, such as dynamic offset cancellation (i.e., chopper stabilization), automatic gain control (AGC) and offset adjustment. Alternatively, or in addition, such features may be provided elsewhere, e.g., between the differential amplifier and the detectors 14, 16.

The magnetic field sensing element 24a (or 24b) in this and other embodiments can be, but is not limited to, a Hall effect element, a magnetoresistance element, or a magnetotransistor. As is known, there are different types of Hall effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, an anisotropic magnetoresistance element (AMR), a tunneling magnetoresistance (TMR) element, and a magnetic tunnel junction (MTJ). The sensing element 24a (or 24b) may include a single element or, alternatively, may include two or more elements arranged in various configurations, e.g., a half bridge or full (Wheatstone) bridge. Depending on the device type and other application requirements, the sensing element 24a (or 24b) may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb). The GMR device may be a spin-valve GMR or other GMR type. If separate sensing dies are used, the sensing dies could be made of different technologies, for example, GaAs, Ge, AMR, GMR, TMR, and others.

As discussed above in the Background, peak detectors such as peak detector 16 track an input signal, that is, the magnetic field signal (e.g., DIFF signal 30, in a differential sensing arrangement) and switch at a threshold level related to peaks of the input signal. Threshold detectors such as threshold detector 14 apply levels with which that input signal is compared to induce switching. These thresholds are defined as a percentage of peak-to-peak amplitude (for example, 85% and 15%, or 60% and 40%). In the illustrated embodiment, both of the detectors 14, 16 are assumed to utilize a tracking-based, relative threshold as opposed to an absolute threshold (e.g., a zero crossing threshold).

In one embodiment, as will be described more fully below, the threshold detector 14 is implemented as a threshold detector that operates in a mode referred to herein as a "rotational threshold mode" (RTM). A threshold detector with this mode maintains a history of "prior" thresholds (thresholds generated for prior cycles or prior cycles of prior revolutions) and uses one or more prior thresholds to establish a threshold for the present cycle. A threshold detector such as threshold detector 14 with RTM may be implemented to include features of the architecture described in U.S. patent application Ser. No. 12/793,813, filed Jun. 4, 2010 and entitled "Circuits and Methods for Generating a Threshold Signal Used in a Motion Detector," incorporated herein by reference in its entirety.

Figure 3A:
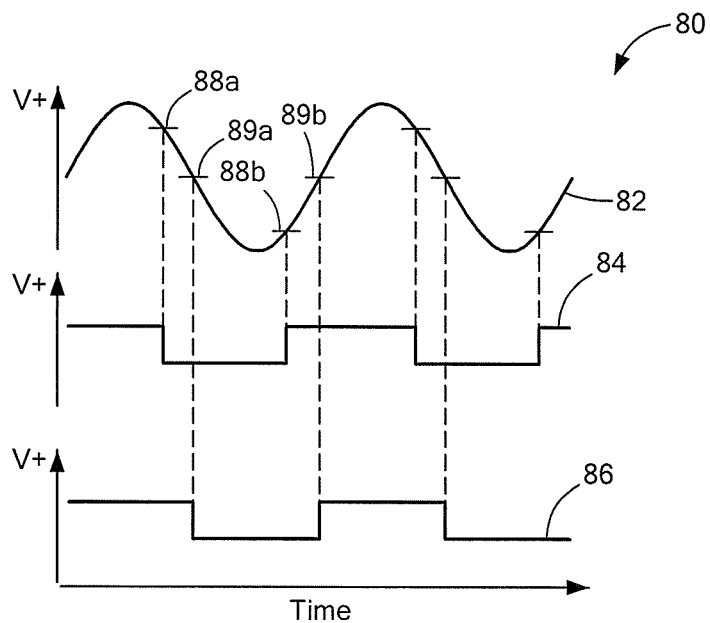
FIGS. 3A-B show waveforms depicting a differential magnetic field signal with corresponding peak detector output signal and threshold detector output signal.
Figure 3B:
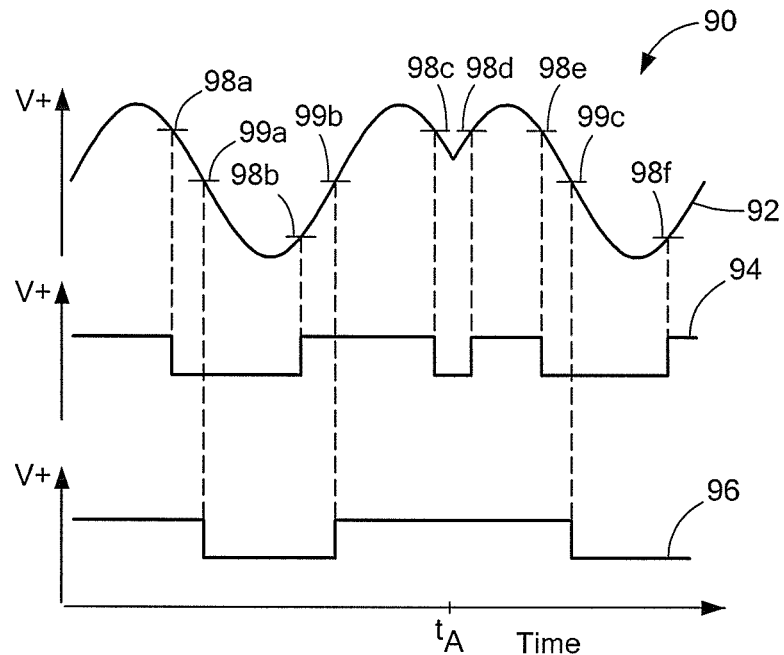

FIGS. 3A and 3B show waveforms that illustrate output switching performed by the detectors 14, 16 for a differential magnetic field signal. FIG. 3A shows waveforms 80 including a differential magnetic field signal waveform 82 corresponding to a mechanical target profile. The positive and negative peaks (of a given cycle) correspond to edges of a target feature. As discussed above, the sensor 10 is capable of providing digital information that is representative of the mechanical features on the rotating target. The waveforms present the translation of the mechanical profile, through the magnetic profile that it induces, to the digital output signal of the sensor. The illustrated waveforms show a particular output polarity for the orientation of a target and sensor that results in the output switching from high (ICC(H) or VOUT (H)) to low as the leading edge of a tooth (a rising mechanical edge, as detected by the sensor), passes the sensor package face. In this configuration, the output switches to its low polarity when a tooth is the target feature nearest the package. If the direction of rotation is reversed, then the output polarity inverts.

Waveforms 80 also include a peak detector output signal waveform 84 and a threshold detector output signal waveform 86. The output signal of waveform 84 switches (or transitions from one state to the other) when the signal of waveform 82 crosses a positive-peak referenced threshold at point 88a and then switches again when the signal crosses a negative-peak referenced threshold at point 88b. The signal of waveform 86 also switches when the signal of waveform 82 crosses thresholds. In the case of the threshold detector, the thresholds are established as percentage of the peak-to-peak signal. For simplicity, FIG. 3A illustrates is 50%, 50% threshold setting. Thus, the signal of waveform 86 switches when the signal of waveform 82 crosses the 50% threshold on the downward slope and the upward slope of the differential magnetic field signal. These points are indicated by reference numerals 89a and 89b. The detector output signal waveforms 84 and 86 illustrate the expected sequence of transitions for the peak detector and threshold detectors when operating in parallel manner. For each half cycle, a transition of the peak detector (e.g., at point 88a) is followed by a transition of the threshold detector (e.g., at point 89a). That transition is followed by a transition of the peak detector (e.g., at point 88b). The typical expected sequence is made of alternating transitions (or switching events), with peak detector transitions followed by corresponding threshold detector transitions. It should be noted that the transitions polarity for the detector output signals can be defined differently (that is the H-to-L transitions could be L-to-H, and the L-to-H transitions H-to-L). The polarity of the detector output signals can be arbitrarily defined.

FIG. 3B shows an example of an inconsistency between the switching of the threshold detector 14 and the switching of the peak detector 16. This inconsistency can be generated by anomalies on the magnetic profile, for example, caused by a direction change, as shown in this figure. Referring to FIG. 3B, waveforms 90 include a differential magnetic field signal waveform 92 generated in response to a target profile of a target experiencing a direction change. Also shown are waveforms 94 and 96 for peak detector and threshold detector output signals, respectively. The thresholds are the same as in the waveforms of FIG. 3A. In this illustration, transitions of the peak detector occur at points indicated by 98a, 98b, 98c, 98d, 98e and 98f. Transitions of the threshold detector occur at points indicated by 99a, 99b and 99c for the same time interval. The direction change, as sensed differentially by the differential magnetic field signal, occurs at around time $t_4$. It can be seen from the figure that the direction change causes the peak detector output signal to switch at point 98d, but the threshold output signal does not switch since the differential magnetic field signal never reaches the 50% threshold crossing. Thus, there are two consecutive peak detector transitions at points 98c and 98d that are not followed by corresponding transitions of the threshold detector output signal.

Even if such inconsistencies do not occur, the operation of the peak detector 16 can be used by the sensor to detect anomalies of this kind as well as others by comparing the actual peak-to-peak values for a current cycle to corresponding prior peak-to-peak values, that is, peak-to-peak values for a corresponding cycle of a previous rotation (or revolution), as will be described. In either case, and referring back to FIG. 1, the ERROR signal 36 can be used to change the detection (or switching) strategy, e.g., to enable the threshold detector 14 to change from one mode to another mode, or to cause the signal presented at the sensor's output 44 by the output signal selector 20 to be changed from the threshold detector output signal to peak detector output signal, or take other action.

Figure 4:
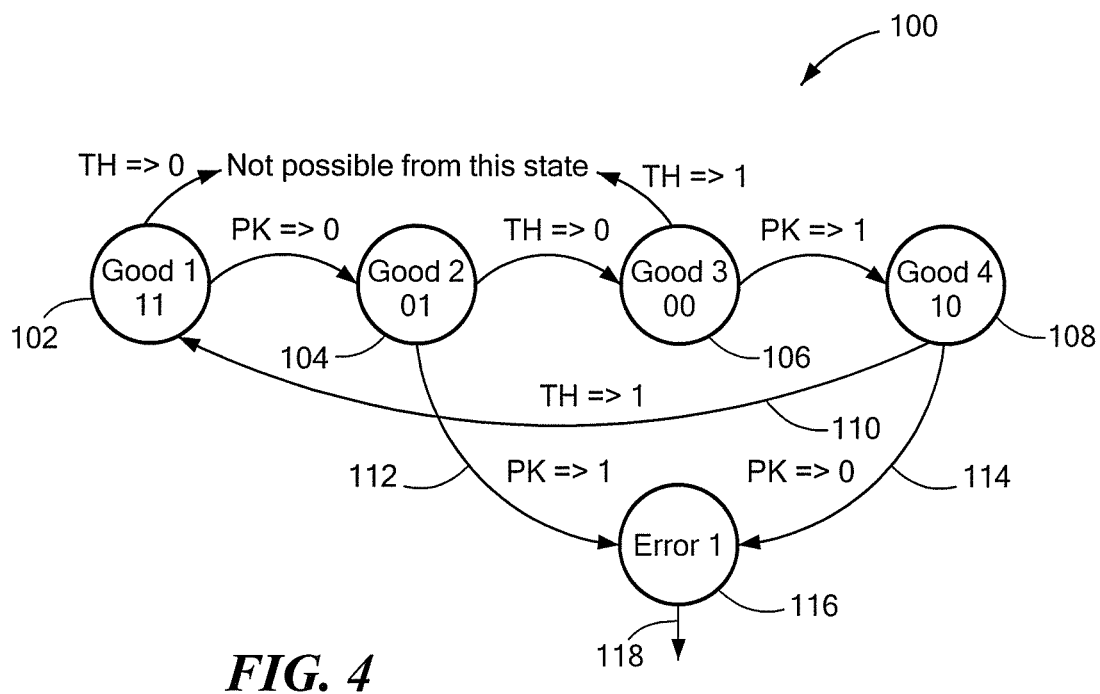
FIG. 4 shows a state diagram illustrating behavior of the switching events monitoring control logic block from FIG. 1 according to one exemplary embodiment.

FIG. 4 shows a state diagram representation 100 of the switching events sequence as illustrated in FIGS. 3A-3B and behavior of the control logic 18 in detecting inconsistencies. Each state is represented by a circle, and the transitions between states are indicated by directed lines connecting the circles. A two-bit binary number inside each circle identifies the state the circle represents. The rightmost bit corresponds to the threshold detector output signal and the other bit corresponds to the peak detector output signal. A first state ('11', "Good 1") 102 corresponds to a state of the detector output signals when the peak detector output signal is a logic 1 and the threshold detector output signal is a logic 1. A next state ('01', "Good 2") 104 corresponds to a state of the detector output signals after the peak detector output signal has transitioned to a logic 0. A next state ('00', "Good 3") 106 corresponds to a state of the detector output signals after the threshold detector output signal has transitioned to a logic 0. A next state ('10', Good 4") 108 corresponds to state of the output signals after the peak detector output signal transitions to a logic 1. When the threshold detector output signal transitions to a logic 1, the sequence is back at state 102 with both detector output signals at a logic 1, as indicated by an arrow 110. Thus, when the pair of detector output signals transition as expected, the sequence of transitions is: state 1, state 2, state 3, state 4, state 1 . . . (all "good" or expected states). If an error or deviation from the expected sequence occurs, for example, after state 2 the peak detector output signal transitions to a logic 1 (as indicated by arrow 112) or after state 4 the peak detector output signal transitions to a logic 0 (as indicated by arrow 114), then an "error" state ("Error 1") 116 is reached. The error state will result in some remedial action being initiated, as indicated by arrow 118.

Figure 5:
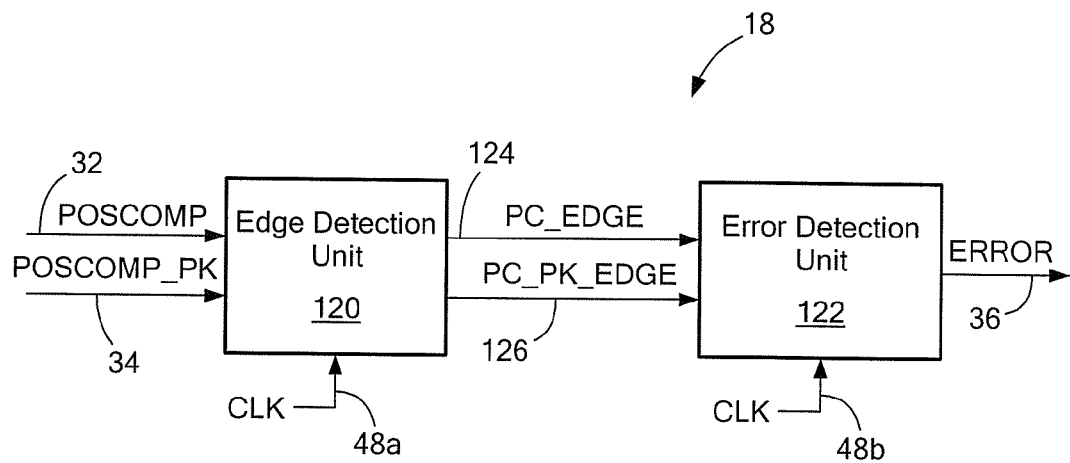
FIG. 5 shows a block diagram of the switching events monitoring control logic block (from FIG. 1) that includes an edge detecting circuit and an error detecting circuit.

FIG. 5 shows a block diagram overview of the control logic 18 in which the functionality of the block 18 is partitioned into two portions or units (or circuits), an edge detection unit (or edge detector) 120 and an error detection unit (or error detector) 122, according to one exemplary embodiment. The edge detection unit 120 receives as inputs the POSCOMP signal 32 from threshold detector 14, the POSCOMP_PK signal 34 from the peak detector 16 and a clock signal shown as clock signal 48a from the clock generator 46 (from FIG. 1).

When a clock pulse provided by the clock signal 48a is applied to circuitry of the edge detection unit 120, the edge detection unit 120 produces two signals, a threshold output edge detected signal shown as "PC_EDGE" signal 124 and a peak detector output edge detected signal shown as "PC_PK_EDGE" signal 126. The PC_EDGE signal 124 has a level or provides a pulse indicative of an edge or transition being detected for the POSCOMP signal 32. The PC_PK_EDGE signal 126 has a level or provides a pulse indicative of an edge or transition being detected for the POSCOMP_PK signal 34. The PC_EDGE signal 124 and PC_PK_EDGE signal 126 are provided as inputs to the error detection unit 122, which also receives a clock signal shown as clock signal 48b. In response to inputs 124, 126 and 48b, and as will be described in greater detail with respect to FIG. 6, the error detection unit 122 generates the error signal 36.

Figure 6:
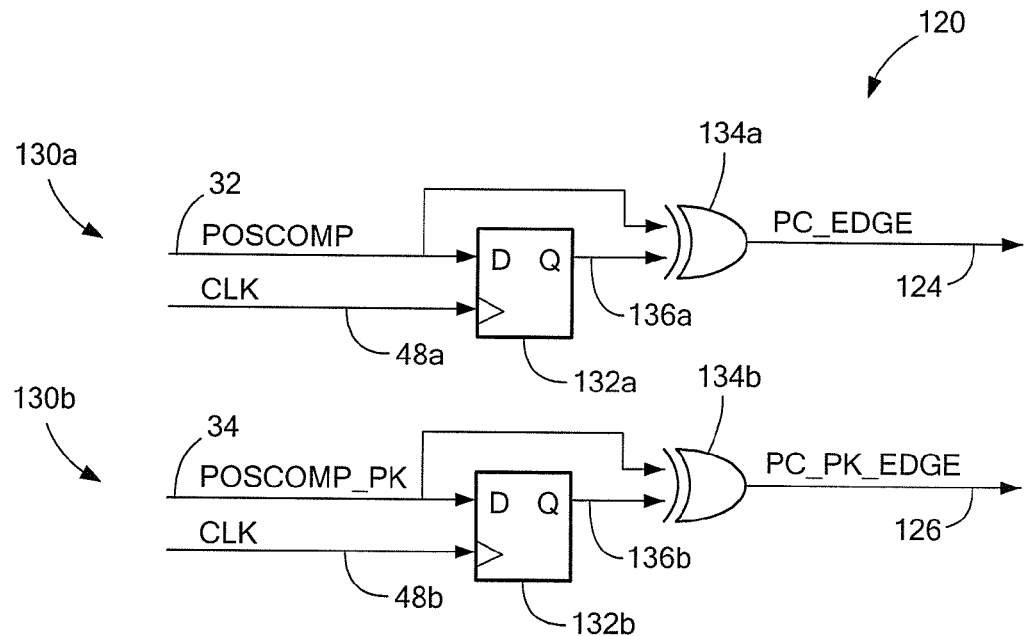
FIG. 6 shows a logic circuit diagram of an exemplary embodiment of the edge detecting circuit (from FIG. 5)

FIG. 6 shows details of the edge detection unit 120 according to one example embodiment. The edge detector 120 includes a first edge detector 130a to detect an edge or transition (or switching event) of the threshold detector's POSCOMP signal 32. The edge detector 120 further includes a second edge detector 130b to detect an edge or transition (or switching event) of the peak detector's POSCOMP_PK signal 34. In the illustrated embodiment, the edge detectors 130a, 130b are implemented with clocked D flip-flops 132a, 132b and exclusive OR gates (XORs) 134a, 134b, respectively. Turning first to the edge detector 130a, the D flip-flop 132a receives as inputs the POSCOMP signal 32 and the clock signal 48a. The Q output, output 136a, and the POSCOMP signal 32 are provided to the XOR gate 134a, which generates the PC_EDGE signal 124 as an output. The second edge detector 130b has the same configuration as edge detector 130a but uses the POSCOMP_PK signal 34 as the D input. Thus, the D flip-flop 132b receives as inputs the POSCOMP_PK signal 34 and the clock signal 48a, e.g., the same clock signal provided to the D flip-flop 132a. The Q output, output 136b, and the POSCOMP_PK signal 34 are provided to the XOR gate 134b, which generates the PC_P-K_EDGE signal 126. Both edge detectors operate in the same manner. When the D flip-flop is clocked, the output Q is set to the D input. The XOR output briefly goes to a logic 1 only when there is a change in the state of the D input. Thus, the PC_EDGE signal 124 is generated to provide a pulse at each edge (or transition) of the POSCOMP signal 32. Similarly, the PC_PK_EDGE signal 126 is generated to provide a pulse at each edge (or transition) of the POSCOMP_PK signal 34.

Figure 7:
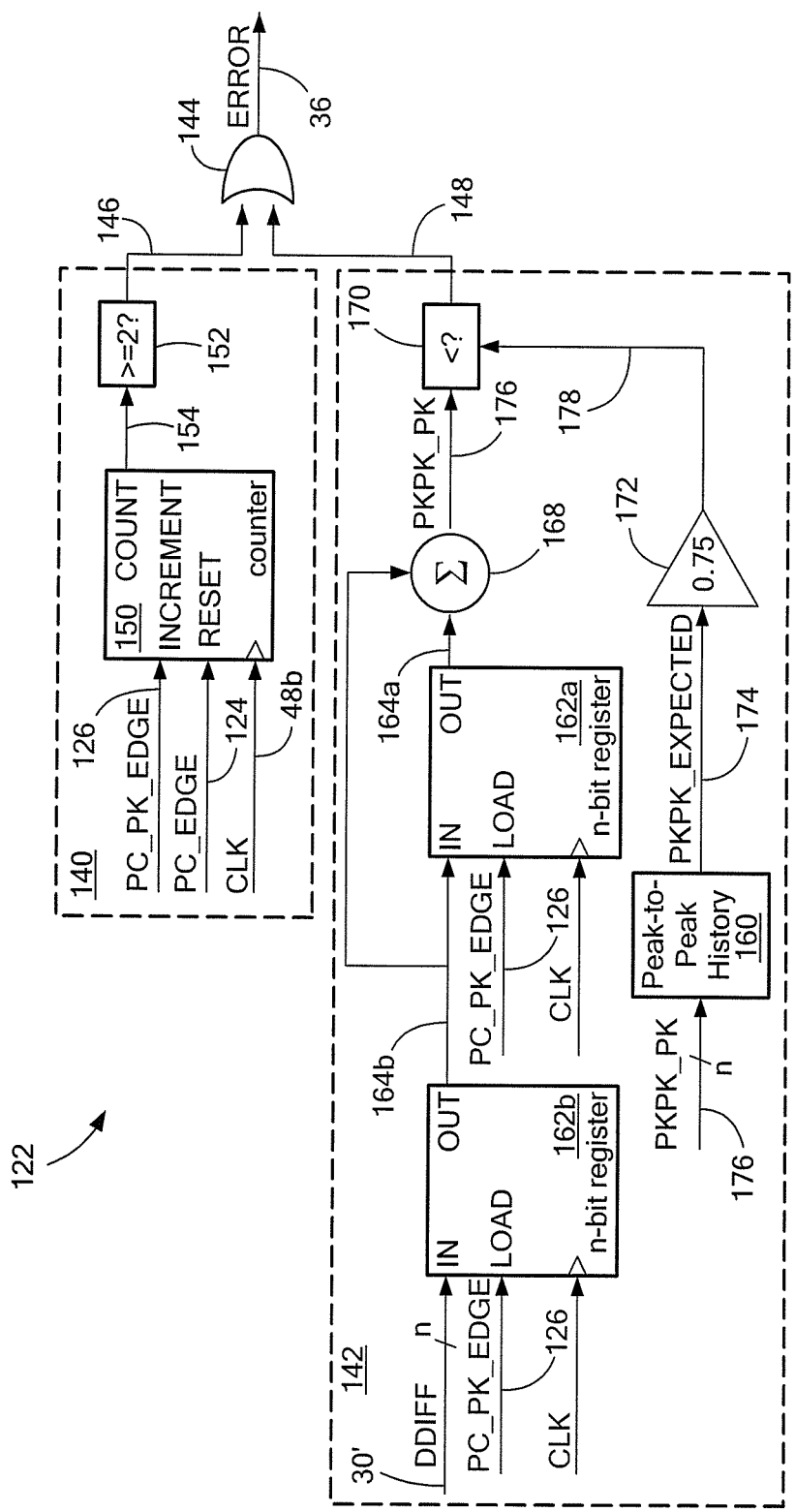
FIG. 7 shows a logic circuit diagram of an exemplary embodiment of the error detecting circuit (from FIG. 5)

FIG. 7 shows details of the error detection unit 122 according to one example embodiment. In the illustrated embodiment, the error detection unit 122 includes a first circuit (or error detector) 140 and a second circuit (or error detector) 142 coupled to a logic circuit shown as an OR gate 144. The OR gate's inputs are the outputs of detectors 140 and 142. The output of the first error detector 140 is shown as a first output (or OR gate input) 146 and the output of the second error detector 142 is shown as second output (or OR gate input) 148. The OR gate 144 provides at its output the ERROR signal 36 based on the logical ORing (or other equivalent operation) of inputs 146 and 148. That is, when at least one of the input signals has a level representing a logic 1, the ERROR signal will also have a level representing a logic 1. Otherwise, the level of the ERROR signal will represent a logic 0.

In this particular embodiment, the error detection unit 122 is designed to detect errors based on the results of both of the error detectors 140, 142. An error at the output of only one of the error detectors 140, 142 or at the outputs of both error detectors 140, 142 can result in the indication of an error at output 36.

For example, and as discussed further below, the unit 122 can use the error detector 140 to detect an "out-of sequence" error when one of the threshold or peak detectors (detectors 14, 16) fails to transition as expected. This behavior was illustrated earlier in the state diagram of FIG. 4. This "missed transition" or "out-of-sequence" type of error can occur for various reasons, such as when a target changes direction. A direction change related error was illustrated in FIG. 3B, which showed a peak detector's output signal transitioning before and after a direction change while the threshold detector's output signal did not transition immediately following the direction change. In addition, in the illustrated embodiment, the unit 122 can use the second error detector 142 to detect problems that may not give rise to a "missed transition" on the part of one of the detectors 14, 16.

In the illustrative embodiment of FIG. 7, the error detector 140 uses a count-based approach and is implemented with a counter 150 and a comparator 152 that performs as a "greater than or equal to 2" ("≥2") comparison operator. The counter 150 receives as its INCREMENT and RESET inputs the two signals PC_PK_EDGE 126 and PC_EDGE 124, respectively, and the clock signal 48b. The counter 150 produces as its output a count value 154, which it provides to the comparator 152. The counter 150 increments its count for each peak detector transition or edge indicated by the PC_PK_EDGE signal 126 and performs a reset for each threshold detector transition or edge indicated by the PC_EDGE signal 124. The comparator output (first output 146) is used to indicate an error when the logic operator result is true, that is, the count value 154 is greater than or equal to 2. Other implementations to detect an "out-of-sequence" type of error are also possible.

The second error detector 142 takes a different approach, one that does not utilize the threshold detector output. Instead, the second error detector 142 compares a digital peak-to-peak value of the DIFF signal (shown as DDIFF) during a current cycle of DIFF signal, that is, the DIFF signal generated for a particular input feature, e.g., gear tooth, and compares it to a previous peak-to-peak value (previous rotation) as detected by the peak detector for that same feature, e.g., gear tooth. This approach requires that the sensor store internally in a memory unit, e.g., a Peak-to-Peak History (for a digital representation of the DIFF signal, "DDIFF" signal) 160, a digital peak-to-peak value for positive and negative peaks detected by the peak detector for each feature (cycle) during each rotation or some desired number of most recent rotations. For example, if M is the desired number of rotations for which peak-to-peak information is to be maintained in memory (where M is the value for the current rotation and M−1 is the previous rotation), "N" denotes the feature (e.g., tooth) number and n is the number of bits used to represent the peak-to-peak value as a digital value, then the history could be configured to store M n-bit values, for example, it could use an n×M (n bits wide by M n-bit words long) storage register (or buffer memory, or other type of data storage element) for each feature number 1, 2, . . . , N−1, N. Alternatively, instead of storing peak-to-peak values, the history could store the individual positive and negative peak values. Logic could be provided along with sample (i.e., feature and rotation) selection logic to derive the peak-to-peak value from the peak values as needed. In one possible implementation, the peak-to-peak history could include an input that tells the memory when to sample new data and change the output data.

In one exemplary embodiment, as illustrated in FIG. 7, the second error detector 142 includes a pair of n-bit shift registers including a first n-bit shift register 162a corresponding to a positive (or negative) peak of the currently detected feature as detected and a second n-bit shift register 162b corresponding to a negative (or positive) peak of the currently detected feature as detected during the current rotation. The shift registers 162a, 162b each are configured to receive a digital version of DIFF signal 30 (shown as DDIFF value as 30') corresponding to the current feature/cycle via the respective shift register input (IN). Both shift registers receive the PC_PK_EDGE signal 126 as a LOAD control and the clock signal 48b. Output lines for shift registers 162a, 162b are indicated by reference numerals 164a, 164b, respectively. When clocked and enabled to load the input data by the PC_PK_EDGE signal 126, shift register 162b is loaded with the current half cycle's DDIFF (positive or negative peak) value. A value of the previous half cycle, having been previously loaded into this shift register, is output and loaded into shift register 162a. The error detector 142 also includes a summer element 168, comparator (or logic operator) 170 and a multiplier element 172 applied to another input value 174 corresponding to a peak-to-peak value for the same feature/cycle as observed during the last rotation. This input value is shown as PKPK_EXPECTED 174 and is provided by (or retrieved from) the Peak-to-Peak History 160. The outputs of the shift registers 162a, 162b, after the registers have been loaded with the positive and negative peaks for the current cycle, are summed at the summer element 168 to produce a current peak-to-peak value (PKPK_PK) for the current cycle, value 176. The PKPK_EXPECTED value 174 is multiplied by some predetermined or relative amount ('x' %, for example, where x=75, as shown) by multiplier element 172. That result, value 178, and the PKPK_PK value 176 are applied as inputs to the comparator 170. Thus, the comparator 170 determines if the current value 176 is less than x % of the previous (PKPK_EXPECTED) value 174 (that is, the value expected for the feature based on what was observed for it during the previous rotation). If it is (that is, the comparator output is TRUE), the comparator's output, output 148, indicates an error. Alternatively, or in addition, the comparator could check if the PKPK_PK value 176 is larger than the PKPK_EXPECTED value 174 by some predetermined or relative amount. As another option, the PKPK_EXPECTED value 174 could be applied directly as an input to comparator 170.

As mentioned above, the peak-to-peak history 160 can include storage, for example, a collection of registers or other suitable forms of storage, sized to hold samples associated with M rotations of the target and N samples per rotation. In some embodiments, the peak-to-peak history can be designed to hold M×N multi-bit (e.g., n-bit, as shown) peak-to-peak samples of the magnetic field signal 18, i.e., a history of the peak-to-peak samples. The storage can store a respective peak value associated with each positive and negative edge of the POSCOMP$_{PK}$ signal according to the edge detection of the PC_PK_EDGE signal. In other embodiments, and as illustrated, the storage can store a respective peak-to-peak value produced from the peak samples for a given cycle of the magnetic field signal (for example, the PKPK_PK value 176 determined by the summer 168).

Although the internal details of the history 160 are not shown, it will be understood that the history 160 would also include control logic that enables the history 160 to store n-bit samples as they are available and to manage the retrieval of each appropriate n-bit sample from among the possible stored samples for use as the "PKPK_EXPECTED" value 174.

One particular reason for maintaining and using the history of peak-to-peak samples in this manner is that, if the peak-to-peak value associated with, a particular feature deviates significantly from rotation to rotation, the deviation can be used to indicate an error at the error signal 36.

Although the peak-to-peak history 160 is shown here as part of the error detector 142, it could reside elsewhere in the sensor, for example it could be included as part of the peak detector 16. In fact, all of the memory elements and circuits used to produce the PKPK_PK value 176 and the PKPK_EX-PECTED value 174 for the error detector's comparison could be part of the peak detector 16.

Other embodiments could of course use one or the other of these error detector blocks by itself. For example, in one alternative embodiment, the edge detection unit 120 could include both edge detectors 130a and 130b and the error detection unit 122 could include only block 140. In an alternative embodiment, the edge detection unit 120 could include only edge detector 130b and the error detection unit 122 could include only block 142. In either of these alternative embodiments, the logic circuit 144 could be omitted and the output of the error detection unit 122 (whether it is the output of block 140 or the output of block 142) would be provided directly as the error signal 36.

The second error detector 142 advantageously provides capability for detecting errors even if both threshold and peak detectors are switching as expected (e.g., by monitoring peak-to-peak amplitude of the DIFF signal over time) or if neither of the threshold detector or peak detectors are switching as expected (which might occur if the direction change occurs near an input signal peak).

Using the error detector 142 in combination with the error detector 140 is a more robust solution than one based on the first error detector 140 alone, as the combined approach not only monitors for missed switching events (as discussed above) but also monitors the behavior of the target's features over multiple peaks so that run-out or variations in amplitude for a given input feature can be detected. Such variations could be symptomatic of an anomaly, for example, a direction change, or gear wear or malfunction, as mentioned above.

Although the peak detector 16 can normally be expected to switch when the threshold detector switches, the control logic 18 (FIG. 5) could be implemented to also include an edge counting detector like block 140 (FIG. 7) that detects if the POSCOMP_PK signal 34 is not switching when the POSCOMP signal 32 switches.

Figure 8:
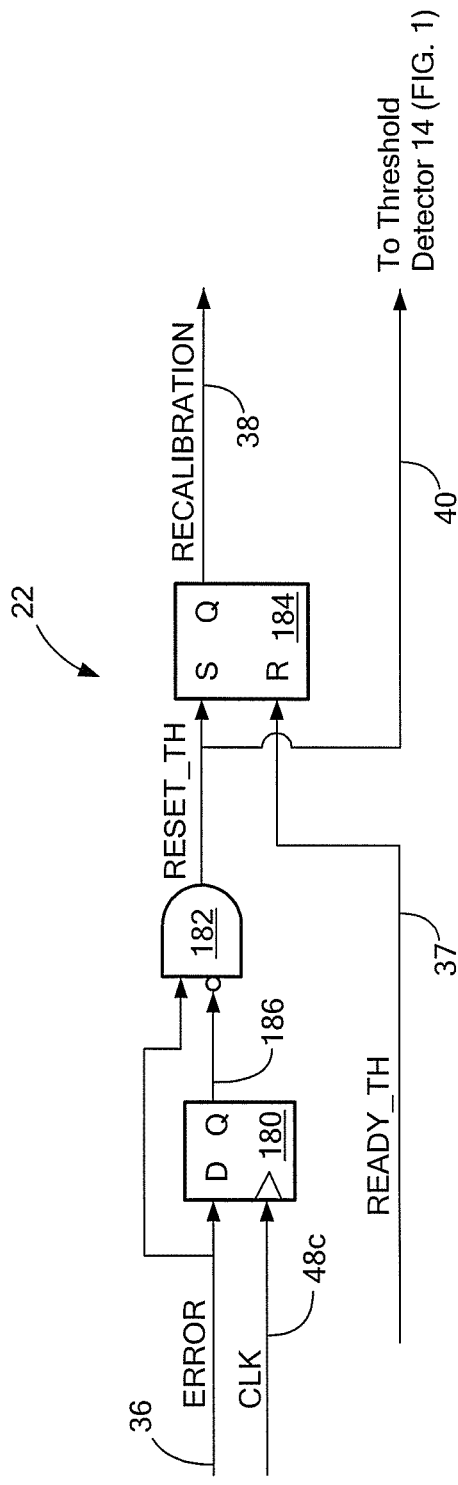
FIG. 8 shows a logic circuit diagram of an exemplary embodiment of the output signal selector from FIG. 1.

FIG. 8 shows an example implementation of the calibration controller 22 (from FIG. 1). In the illustrated implementation, the controller 22 includes a clocked D flip-flop 180, logic circuit shown as an AND gate (with one inverted input) 182 and an SR flip-flop 184. The D flip-flop 180 has as its D input the ERROR signal 36 (from FIG. 7), a clock input 48c and Q output 186. The Q output is provided to the inverted input of AND gate 182. The AND gate's other input is the ERROR signal 36. The AND gate output is reset threshold signal (RESET_TH) output 40. The SR flip-flop 184 receives as its S and R inputs the RESET_TH signal 40 and the READY_TH control signal 37. As indicated in the figure, and shown earlier in FIG. 1, the READY_TH signal 37 is provided from and the RESET_TH signal 40 is provided to the threshold detector 14. Still referring to FIG. 8, the SR flip-flop 184 produces at its Q output the RECALIBRATION signal 38. Based on the operations of the D flip flop 180 and the AND gate logic 182, the state of the RESET_TH signal 40 changes from a logic 0 to a logic 1 only when the state of the ERROR signal 36 changes from logic 0 to logic 1. When the RESET_TH signal 40 is at a logic 1 and The READY_TH signal 37 is a logic 0, the RECALIBRATION signal 38 is logic 1. When the RESET_TH signal 40 returns to logic 0, the RECALIBRATION signal 38 remains at a logic 1 until the READY_TH signal 37 transitions from logic 0 to logic 1. The RECALIBRATION signal 38 stays at a logic 0 until the RESET_TH signal 40 changes to a logic 1 again.

The threshold detector 14 can contain control logic to recalibrate in response to some signal, e.g., power-on signal, or event. The recalibration requires that the threshold detector 14, if operating in a mode that utilizes a history of thresholds like the above-described RTM, change to a mode that uses a threshold generated for the current cycle (e.g., a non-RTM) and continues to operate in that mode until it can rebuild its history of thresholds over the course of some number of successive cycles (or even rotations). In the embodiment described herein, that control logic is responsive to the RESET_TH signal 40, which causes the threshold detector 14 to reset to the non-RTM and recalibrate in response to RESET_TH 40. The READY_TH signal 37 can be generated by the threshold detector 14, as shown in the figures, or by some other sensor circuitry. It can be used by the threshold detector 14 to indicate that, based on some predetermined criteria, e.g., a completion of the threshold detector recalibration, if performed, or completion of some number of cycles of operating in a non-RTM (if not part of a recalibration procedure), the threshold detector 14 is ready to begin operating in the RTM again. The use of the RESET_TH and READY_TH signals is further described below with reference to FIG. 10.

Figure 9:
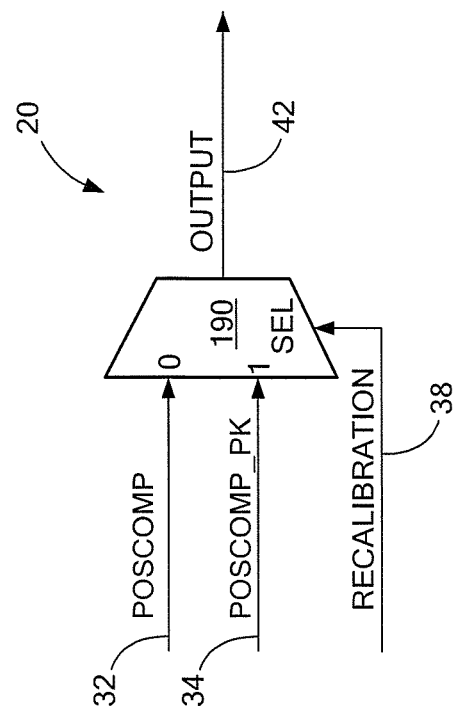
FIG. 9 shows a logic circuit diagram of an exemplary embodiment of the calibration controller from FIG. 1.

Turning to FIG. 9, details of an example implementation of the output signal selector 20 (from FIG. 1) are shown. In the illustrated example, the output signal selector 20 includes a multiplexer (or MUX) 190 configured with the POSCOMP signal 32 and the POSCOMP_PK signal 34 as '0' and '1' inputs, respectively, the RECALIBRATION signal 38 as a select (SEL) control signal, and the OUTPUT signal 42 (the sensor output, from FIG. 1) as its output. When the RECALIBRATION signal 38 is a logic 0, the output signal selector 20 selects the POSCOMP signal 32 (that is, the threshold detector output signal) as the sensor output. When RECALIBRATION signal 38 is a logic 1, the output signal selector 20 selects the POSCOMP_PK signal 34 (the output signal of the peak detector) instead.

Thus, the output signal selector 20 selects the peak detector output signal (POSCOMP_PK signal) 34 as the OUTPUT 42 when the ERROR signal 36 indicates an error and selects the threshold detector output signal (POSCOMP signal) 32 after the threshold detector 14 has completed a recalibration or is otherwise ready to resume operating in RTM (as indicated by the state of the READY_TH signal 37). Alternatively, the sensor could be designed so that it continues to use the peak detector output 34, or uses only the threshold detector output 32 regardless of whether or not an error is indicated (in which case the output signal selector 20 could be eliminated).

As described earlier, the operation of the error detector 140 (FIG. 7) allows the sensor to identify and react to inconsistencies between the detector output signals 32 and 34. It does so by determining if the switching events occur in the expected order. Many input signal abnormalities, including certain direction change scenarios, can be detected due to a violation of the expected order.

The threshold detector 14 may be provided with functionality that allows it to operate in a first mode using a first threshold that is generated for a current cycle or a second mode, introduced above as "RTM", using a second threshold that is generated using a threshold history. An architecture of this type is described in the above-referenced U.S. patent application Ser. No. 12/793,813, which also describes using a multiplexer to select between the first threshold and the second threshold based on the application of a power-on signal.

If the threshold detector 14 is operating in RTM, when it processes a passing gear tooth it may use information acquired when the tooth passed during the gear's preceding revolution. If there is a direction change or some other anomaly that causes a "missed transition" to be detected, the state of the output 146 produced by error detector 140 (FIG. 7) will indicate an error. If the state of the output 146 indicates a missed transition on the part of the threshold detector 14, the threshold detector 14 will apply the wrong historic information to the upcoming teeth. To prevent such a scenario, the RESET_TH signal 40 (produced by circuit 22, FIG. 8), along with other logic, as described below with reference to FIG. 10, can be used to "reset" aspects of the threshold detector operation.

Figure 10:
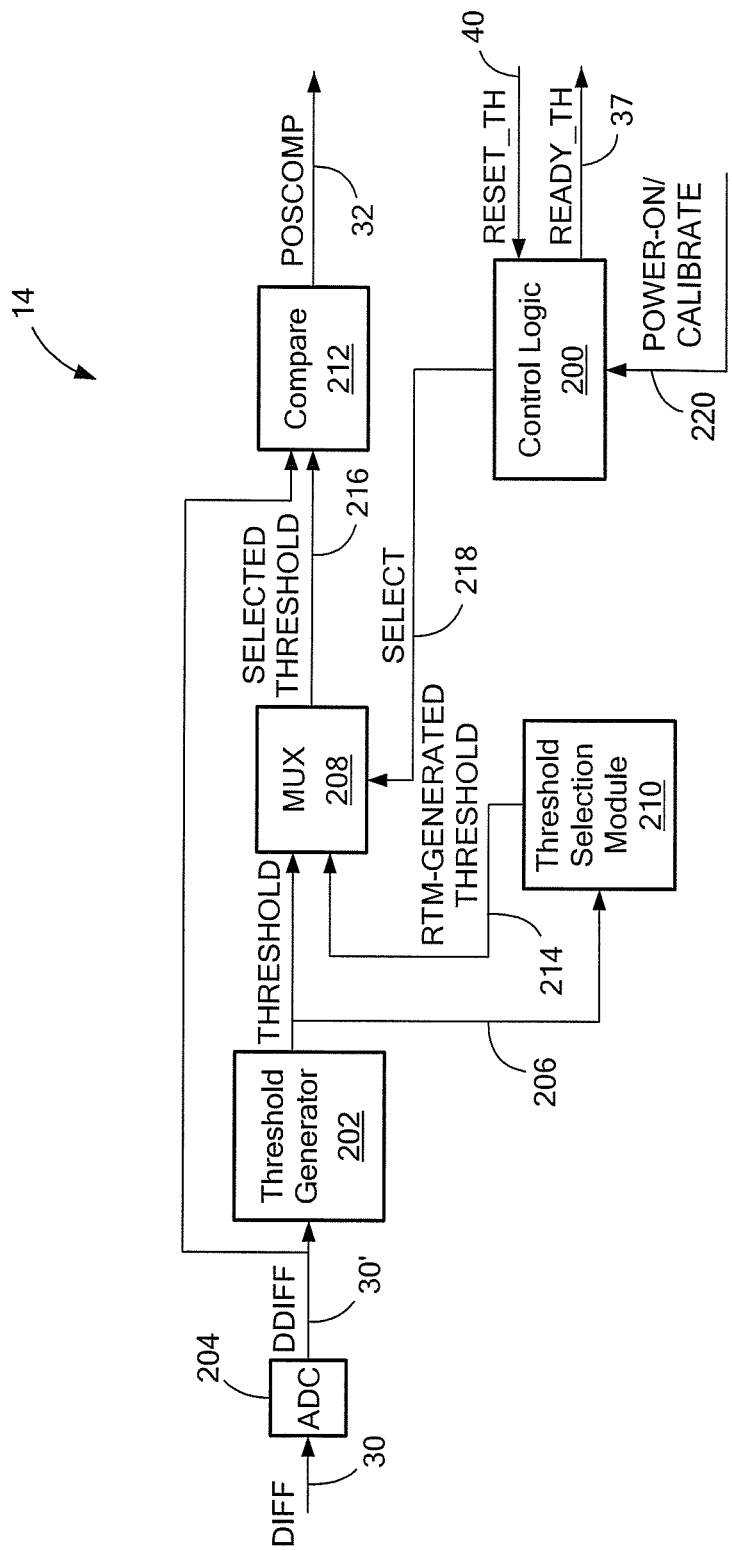
FIG. 10 shows a block diagram of an exemplary embodiment of the threshold detector from FIG. 10.

FIG. 10 shows details of the threshold detector 14 with such RTM capability, but modified to incorporate features responsive to the above-described error signal generation, in particular, a control logic block 200 that is responsive to at least the RESET_TH signal 40 to change the threshold selection (from RTM to non-RTM based) for a predetermined time interval, for example, the time for completing a recalibration, and then generate the READY_TH signal 37.

In the illustrated example, the threshold detector 14 includes a threshold generator 202 to receive the DIFF signal 30 after the DIFF signal 30 has been converted from an analog signal to a digital signal (shown as DDIFF 30') by an analog-to-digital converter (ADC) 204 and to generate a first threshold signal 206 based on the DDIFF signal 30'. The threshold detector 14 further includes a multiplexer (MUX) 208, a threshold selection module 210 and a comparator 212. The first threshold signal 206 is provided as one of two inputs to MUX 208 and is also provided to the threshold selection module 210. The threshold selection module is implemented to generate a second threshold signal 214 from an internal threshold history, for example, according to techniques described in the above-referenced U.S. patent application. As shown, the multiplexer 208 is coupled to receive the first threshold signal 206 and the second threshold signal 214, and configured to generate an output signal 216 as a selected one of the first threshold signal 206 or the second threshold signal 214 under control by a select signal 218 generated by the control logic 200. The output signal 216 and DDIFF 30' are provided as inputs to the comparator 212, which produces the POSCOMP signal 32 based in those inputs. The control logic 200 operates to change the state of the select signal 218 to switch the MUX selection from the second threshold signal 214 to the first threshold signal 206 when either the RESET_TH signal 40 or an externally generated power-on (and/or calibrate) signal 220 is set to a logic 1 level. The threshold signal selection will remain unchanged for a predetermined time or until the occurrence of a predetermined event, at which point the control logic 200 will change the state of the select signal 218 so that the MUX 208 selects as the threshold signal 216 the second threshold signal 214 and will set the READY_TH signal 37 to a logic 0 level. For example, for a time shortly after the threshold detector 14 is first powered on, e.g., during an initial calibration time period, the MUX 208 selects as the output signal the first threshold signal 206, and thereafter, e.g., during a running mode of operation, the MUX 208 can select as the output signal 216, the second threshold signal 214. This arrangement may be necessary immediately after power up, as there is no threshold history and a threshold from a previous revolution of the gear target is not available. When the logic level of the RESET_TH signal 40 indicates the detection of an error detected by control logic 18, it may be desirable to adjust the threshold signal selection for a predetermined time period that may be the same as the calibration time period or a different time period. The RESET_TH signal 40 could instead be applied to the same external power-on/calibration control logic that controls power up and calibration activities for the entire sensor (and that generates the power-on/calibrate signal 220) and used to re-start/recalibrate the sensor.

Referring back to FIGS. 8 and 9, setting the READY_TH signal 37 to a logic 1 level will serve to reset the RECALIBRATION signal 38 so that the RECALIBRATION signal 38 controls the MUX 190 to select the POSCOMP signal 32 as the output signal 42.

The sensor architecture described herein provides a simple mechanism to prevent sensor malfunction (in the presence of some magnetic anomaly). It uses the outputs of threshold and peak detectors for error detection, and does not require more complex vibration or direction change detecting functionality.

Although the details of the sensor architecture presented herein focus on applications with rotating targets having mechanical profile features, such as toothed gear wheels, it will be understood that the circuits and techniques of the sensor architecture may be applicable to sensing of other types of targets as well. For example, the target could be implemented to include an object made of a hard ferromagnetic material (that is, a permanent magnet) such as a ring magnet or other type of multi-pole magnet. Such a target could have a profile with a pattern of magnetic 'features' defined by a sequence of alternating north and south magnetic poles, instead of a pattern of mechanical features such as teeth and valleys, as described above.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A sensor comprising:
   a magnetic field signal generating circuit comprising at least one sensing element, to generate a magnetic field signal indicative of features of a rotational ferromagnetic object as the features pass in front of the at least one sensing element;
   a threshold detector, responsive to the magnetic field signal, to generate a threshold detector output signal having transitions associated with a comparison of the magnetic field signal to a first threshold that is a percentage of the peak-to-peak magnetic field signal;
   a peak detector, responsive to the magnetic field signal, to generate a peak detector output signal having transitions associated with a comparison of the magnetic field signal to a second threshold that is related to a peak of the magnetic field signal; and
   a circuit, coupled to the threshold detector and peak detector, to detect the transitions of the threshold detector output signal and peak detector output signal, and to use the detected transitions to detect an error if a sequence in which the transitions occur deviates from an expected sequence, wherein the expected sequence is based on the first and second thresholds.

2. The sensor of claim 1 wherein the circuit operates to generate an error signal having a level indicative of the error when such error is detected.

3. The sensor of claim 2 wherein the circuit comprises an edge detection circuit to detect the transitions of the peak and threshold output signals and an error detection circuit coupled to the edge detection circuit and responsive to the transitions detection to generate the error signal.

4. The sensor of claim 3 wherein the edge detection circuit comprises a first edge detector to detect each transition of the peak detector output signal and a second edge detector to detect each transition of the threshold detector output signal.

5. The sensor of claim 4 wherein the error detection circuit comprises a first circuit, responsive to the edge detection circuit, to monitor the sequence of the transitions of the peak detector output signal and the threshold detector output signal and to generate a first circuit output signal having a level indicative of a first error when the monitoring detects that the sequence has deviated from the expected sequence.

6. The sensor of claim 5 wherein the first circuit output signal is provided as the error signal.

7. The sensor of claim 5 wherein the first circuit comprises a counter configured to increment a count value in response to each detected peak detector output signal transition and reset the count value in response to each detected threshold detector output signal transition, and further comprising a comparator to compare the count value to a count limit and set the first circuit output signal level to the level indicative of the first error when the count value reaches the count limit.

8. The sensor of claim 5 wherein the first circuit comprises a counter configured to increment a count value in response to each detected threshold detector output signal transition and reset the count value in response to each detected peak detector output signal transition, and further comprising a comparator to compare the count value to a count limit and set the first circuit output signal level to the level indicative of the first error when the count value reaches the count limit.

9. The sensor of claim 5 wherein the error detection circuit further comprises a second circuit, responsive to the detected peak detector output signal transitions, to compare a peak-to-peak value of the magnetic field signal associated with the detected peak detector output signal transitions for a current cycle to an expected peak-to-peak value and to provide a second circuit output signal based on the comparison.

10. The sensor of claim 9 wherein the expected peak-to-peak value is a peak-to-peak value of the magnetic field signal for a corresponding cycle of a prior rotation of the target.

11. The sensor of claim 9 wherein the second circuit comprises a comparator to compare the peak-to-peak value to a predetermined percentage of the expected peak-to-peak value.

12. The sensor of claim 9 wherein the error detection circuit further comprises a logic circuit to generate the error signal based on the first circuit output signal and the second circuit output signal.

13. The sensor of claim 4 wherein each of the first and second edge detectors operates to generate an output signal that provides a pulse for each detected transition.

14. The sensor of claim 1 wherein the at least one sensing element comprises a pair of sensing elements and the magnetic field signal is a differential magnetic field signal based on differential sensing by the pair of sensing elements.

15. The sensor of claim 1 wherein each of the at least one sensing element is a selected one of a Hall-effect element, magnetoresistance (MR) element or other type of magnetic field sensitive element.

16. The sensor of claim 15 wherein material used to implement each of the at least one sensing element is a selected one of type IV semiconductor material or a type III-V semiconductor material.

17. The sensor of claim 1 wherein the ferromagnetic object is a hard ferromagnetic material.

18. The sensor of claim 1 wherein the ferromagnetic object is a soft ferromagnetic material magnetized by a biasing permanent magnet.

19. A sensor comprising:
a magnetic field signal generating circuit comprising at least one sensing element, to generate a magnetic field signal indicative of features of a rotational ferromagnetic object as the features pass in front of the at least one sensing element;
a threshold detector, responsive to the magnetic field signal, to generate a threshold detector output signal having transitions associated with cycles of the magnetic field signal;
a peak detector, responsive to the magnetic field signal, to generate a peak detector output signal having transitions associated with the cycles of the magnetic field signal; and
a circuit, coupled to the threshold detector and peak detector, to detect the transitions of the threshold detector output signal and peak detector output signal, and to use the detected transitions to detect an error if a sequence in which the transitions occur deviates from an expected sequence, wherein the circuit operates to generate an error signal having a level indicative of the error when such error is detected; and
an output signal selector having a first input responsive to the threshold detector output signal, a second input responsive to the peak detector output signal, and has a control signal to select one of the threshold and peak detector output signals as an output signal based on the error signal generated by the circuit.

20. The sensor of claim 19 wherein the threshold detector is configured to operate in a first mode followed by a second mode, and is caused to return to operating in the first mode when the level of the error signal indicates an error.

21. The sensor of claim 20 wherein the threshold detector operates in the first mode for a recalibration time period.

22. The sensor of claim 21 wherein, when the recalibration time period is complete, the threshold detector resumes operating in the second mode and generates a signal to reset the state of the control signal.

23. A sensor comprising:
a magnetic field signal generating circuit comprising at least one sensing element, to generate a magnetic field signal indicative of features of a rotational ferromagnetic object as the features pass in front of the at least one sensing element;
a threshold detector, responsive to the magnetic field signal, to generate a threshold detector output signal having transitions associated with cycles of the magnetic field signal;
a peak detector, responsive to the magnetic field signal, to generate a peak detector output signal having transitions associated with the cycles of the magnetic field signal; and
a circuit, coupled to the threshold detector and peak detector, to detect the transitions of the peak detector output signal and use the detected transitions to detect an error when a peak-to-peak value of the magnetic field signal associated with the detected transitions for a current cycle differs from an expected peak-to-peak value by a predetermined amount.

24. The sensor of claim 23 wherein the circuit operates to generate an error signal having a level indicative of the error when such error is detected.

25. The sensor of claim 24 wherein the circuit comprises an error detection circuit to compare the peak-to-peak value to a predetermined percentage of the expected a peak-to-peak value and to set the error signal based on the comparison.

26. The sensor of claim 23 wherein the expected peak-to-peak value is peak-to-peak value of the magnetic field signal for a corresponding cycle of a prior rotation of the target.

27. The sensor of claim 23 wherein the at least one sensing element comprises a pair of sensing elements and the magnetic field signal is a differential magnetic field signal based on differential sensing by the pair of sensing elements.

28. The sensor of claim 23 wherein each of the at least one sensing element is a selected one of a Hall-effect element, magnetoresistance (MR) element or other type of magnetic field sensitive element.

29. The sensor of claim 28 wherein material used to implement each of the at least one sensing element is a selected one of type IV semiconductor material or a type III-V semiconductor material.

30. The sensor of claim 23 wherein the ferromagnetic object is a hard ferromagnetic material.

31. The sensor of claim 23 wherein the ferromagnetic object is a soft ferromagnetic material magnetized by a biasing permanent magnet.

32. A sensor comprising:
a magnetic field signal generating circuit comprising at least one sensing element, to generate a magnetic field signal indicative of features of a rotational ferromagnetic object as the features pass in front of the at least one sensing element;
a threshold detector, responsive to the magnetic field signal, to generate a threshold detector output signal having transitions associated with cycles of the magnetic field signal;
a peak detector, responsive to the magnetic field signal, to generate a peak detector output signal having transitions associated with the cycles of the magnetic field signal; and
a circuit, coupled to the threshold detector and peak detector, to detect the transitions of the peak detector output signal and use the detected transitions to detect an error when a peak-to-peak value of the magnetic field signal associated with the detected transitions for a current cycle differs from an expected peak-to-peak value by a predetermined amount, wherein the circuit operates to generate an error signal having a level indicative of the error when such error is detected; and
an output signal selector having a first input responsive to the threshold detector output signal, a second input responsive to the peak detector output signal, and has a control signal to select one of the threshold and peak detector output signals as an output signal based on the error signal generated by the circuit.

33. The sensor of claim 32 wherein the threshold detector is configured to operate in a first mode followed by a second mode, and is caused to return to operating in the first mode when the level of the error signal indicates an error.

34. The sensor of claim 33 wherein the threshold detector operates in the first mode for a recalibration time period.

35. The sensor of claim 34 wherein, when the recalibration time period is complete, the threshold detector resumes operating in the second mode and generates a signal to reset the state of the control signal.

* * * * *